US008746414B2

(12) United States Patent
Hynni et al.

(10) Patent No.: US 8,746,414 B2
(45) Date of Patent: Jun. 10, 2014

(54) ELEVATOR SYSTEM

(75) Inventors: Matti Hynni, Hämeenlinna (FI); Anssi Karppinen, Hikiä (FI); Arto Tuhkio, Tervakoski (FI)

(73) Assignee: Kone Corporation, Helsinki (FI)

( * ) Notice: Subject to any disclaimer, the term of this patent is extended or adjusted under 35 U.S.C. 154(b) by 812 days.

(21) Appl. No.: 12/107,838

(22) Filed: Apr. 23, 2008

(65) Prior Publication Data

US 2008/0210494 A1 Sep. 4, 2008

Related U.S. Application Data

(63) Continuation of application No. PCT/FI2006/000368, filed on Nov. 13, 2006.

(30) Foreign Application Priority Data

Nov. 14, 2005 (FI) ..................................... 20051157

(51) Int. Cl.
*B66B 19/02* (2006.01)
*B66B 7/10* (2006.01)
*B23P 6/00* (2006.01)
*F16G 11/00* (2006.01)

(52) U.S. Cl.
USPC ........ 187/414; 187/264; 187/266; 29/402.08; 29/402.11; 29/426.1; 29/525.01

(58) Field of Classification Search
CPC .......... B66B 7/10; B66B 11/007; B66B 19/02
USPC ......... 187/251, 266, 371, 372, 377, 414, 264, 187/900; 52/202, 2.3, 15; 29/402.11, 29/402.08, 426.1, 426.3, 428, 429, 525.01
IPC .............. B66B 19/02,11/08, 7/00; F16G 11/00, F16G 11/08; D07B 9/00; B65H 69/06
See application file for complete search history.

(56) References Cited

U.S. PATENT DOCUMENTS

| | | | | |
|---|---|---|---|---|
| 646,049 | A * | 3/1900 | Fraser | 187/260 |
| 912,256 | A * | 2/1909 | Neenan | 187/264 |
| 1,976,494 | A * | 10/1934 | Halfvarson | 187/264 |
| 2,295,381 | A * | 9/1942 | Bouton | 187/264 |
| 2,482,204 | A * | 9/1949 | Peterson | 57/202 |
| 5,277,276 | A * | 1/1994 | Pramanik et al. | 187/411 |
| 5,861,084 | A * | 1/1999 | Barker et al. | 187/264 |
| 2005/0217944 | A1 * | 10/2005 | Aulanko et al. | 187/266 |

FOREIGN PATENT DOCUMENTS

| | | | | |
|---|---|---|---|---|
| DE | 30 25 954 | A1 | 2/1982 | |
| EP | 1 591 406 | A2 | 11/2005 | |
| GB | 2250012 | A * | 5/1992 | B66B 11/08 |
| JP | 01017780 | A * | 1/1989 | F16G 11/00 |

(Continued)

*Primary Examiner* — William A Rivera
*Assistant Examiner* — Stefan Kruer
(74) *Attorney, Agent, or Firm* — Birch, Stewart, Kolasch & Birch, LLP

(57) ABSTRACT

The invention relates to a method for replacing the hoisting ropes of an elevator. By the method of the invention, the hoisting ropes (4) are replaced by first joining the old and new hoisting ropes (4*a*, 4*b*) together by their one ends by splicing the ends together around a common core strand (17), whereupon the new set (4*b*) of hoisting ropes is pulled into place by means of the old set (4*a*) of hoisting ropes.

18 Claims, 3 Drawing Sheets

(56) References Cited

FOREIGN PATENT DOCUMENTS

| | | | | | |
|---|---|---|---|---|---|
| JP | 5-44785 A | | 2/1993 | | |
| JP | 2003238047 A | * | 8/2003 | ................ | B66B 7/06 |
| WO | WO 0050328 A2 | * | 2/2000 | | |
| WO | WO 2004094289 A1 | * | 11/2004 | ............. | B66B 11/08 |
| WO | WO 2005121006 A1 | * | 12/2005 | ................ | B66B 5/16 |

* cited by examiner

ELEVATOR SYSTEM

This application is a Continuation of copending PCT International Application No. PCT/FI2006/000368 filed on Nov. 13, 2006, which designated the United States, and on which priority is claimed under 35 U.S.C. §120. This application also claims priority under 35 U.S.C. §119(a) on Patent Application No(s). FI20051157 filed in Finland on Nov. 14, 2005. The entire contents of each of the above documents is hereby incorporated by reference.

FIELD OF THE INVENTION

The present invention relates to a method for changing the hoisting ropes of an elevator.

BACKGROUND OF THE INVENTION

Elevator safety regulations require that the hoisting ropes of a roped elevator should be replaced with a new set of hoisting ropes at certain intervals, because the ropes are subject to wear during use and may break if worn too badly. In prior art, hoisting ropes have been changed by first removing the old ropes and then mounting the new ropes in place. This solution has the drawback that changing the ropes by this method is a slow and difficult procedure that takes up plenty of time. Especially in the case of elevators without counterweight, which have a large suspension ratio, e.g. in the range of 4:1-12; 1, changing the ropes by this traditional method is often a very laborious and slow operation due to the numerous diverting pulleys, and it is not necessarily always safe, either.

A prior-art method for replacing the hoisting ropes of an elevator is presented in specification JP 5-44785, wherein the new and old ropes are spliced together. In the solution described, half of the strands are cut off, with the result that the tensile strength of the rope decreases and the method additionally requires the use of a cable pulling sleeve, which increases the thickness of the splice.

SUMMARY OF THE INVENTION

The object of the present invention is to overcome the above-mentioned drawbacks and to create an easy and fast as well as safe method for replacing the hoisting ropes of an elevator. The method of the invention is fully described below.

Inventive embodiments are also presented in the description part and drawings of the present application. The inventive content disclosed in the application can also be defined in other ways than is described below. The inventive content may also consist of several separate inventions, especially if the invention is considered in the light of explicit or implicit sub-tasks or in respect of advantages or sets of advantages achieved. In this case, some of the attributes contained in the claims below may be superfluous from the point of view of separate inventive concepts. Similarly, within the framework of the basic concept of the invention, different details described in connection with each example embodiment of the invention may be used in other example embodiments as well.

The method of the invention has the advantage that, even in the case of a complex rope suspension, the hoisting ropes can be replaced easily, quickly and safely. Another advantage is that the old and new hoisting ropes can be joined together almost seamlessly without increasing the rope diameter at the splice, and thus the new hoisting ropes can be pulled into place at once by using the old ropes as an aid, even if the jump guards around the ropes should be very close to the ropes. A further advantage is that the rope splice has a tensile strength sufficient for the mounting work and that it is flexible, so that it runs well in the grooves of the pulleys when the change is being performed. The solution of the invention is well applicable in the case of hoisting ropes of steel having a diameter of 4 mm or more. Yet another advantage is that the rope diameter is not increased, because in the method of the invention every second strand in the circumferential direction is cut off from both the old and the new ropes and the strands are intertwined crosswise and compressed, with the result that the compression resistance increases and the whole splice is made stronger, its tensile strength increases and yet the thickness of the rope itself is not increased at all.

In an embodiment of the method for replacing the ropes of an elevator, said elevator comprising at least an elevator car moving along guide rails in an elevator shaft in a substantially vertical direction and provided with a safety gear, a hoisting machine, a traction sheave and a set of ropes, the ropes of the new set of ropes and the ropes of the old set of ropes are joined together by splicing the ropes together by their one ends, whereupon the new set of ropes is pulled into place by means of the old set of ropes.

In an embodiment of the method, the thickness of the splice is kept substantially equal to the diameter of the hoisting rope. The ropes are twined in such a way that the splice will not be substantially thicker than either one of the ropes to be spliced together alone.

In an embodiment of the method, the ropes of the set of ropes to be replaced are hoisting ropes. One ends of each new and old hoisting rope are untwisted through a suitable length of rope, every second strand in the circumferential direction is removed from the untwisted ends and the core strand of one of the hoisting ropes is cut and the untwisted hoisting rope ends are spliced together around the core strand of the other hoisting rope. Thus, in this embodiment a strand is cut off from the first rope whereas the corresponding strand in the second rope is not cut off, and similarly the next strand in the first rope is not cut off but the next strand in the second rope is, and these so-called alternate strands are spliced together.

In an embodiment of the method, the ends of the hoisting ropes are spliced together around the core strand of one of the hoisting ropes in such manner that the thickness of the finished splice is substantially equal to the diameter of the hoisting rope.

In an embodiment of the method, the ends of the hoisting ropes are spliced together around the core strand of one of the hoisting ropes in such manner that the length of the finished splice is substantially between 10-80 cm, preferably about 20 cm, and that the flexibility of the splice is substantially the same as the flexibility of the hoisting rope.

In an embodiment of the method, at least the following operations are performed in conjunction with the replacement of the set of hoisting ropes: the elevator car is locked in place in the elevator shaft, the rope tensions are equalized on both sides of the hoisting machine by releasing the brake of the hoisting machine and locking the brake in the released position, disconnecting the supply cable of the hoisting machine, the compensating sheave is locked in an upper position, the hoisting ropes of the old set of hoisting ropes are disengaged from the wedge rope sockets of the compensating sheave, the hoisting ropes of the new set of hoisting ropes and the hoisting ropes of the old set of hoisting ropes are spliced together by their one ends, the hoisting ropes of the old set of hoisting ropes are released from their other anchorage and finally the hoisting ropes of the old set of hoisting ropes are pulled away from their place, simultaneously feeding the hoisting ropes of the new set of hoisting ropes in place of the old hoisting ropes.

BRIEF DESCRIPTION OF THE DRAWINGS

In the following, the invention will be described in detail by referring to an embodiment example and the attached drawings, wherein.

DETAILED DESCRIPTION OF THE INVENTION

Figure 1:
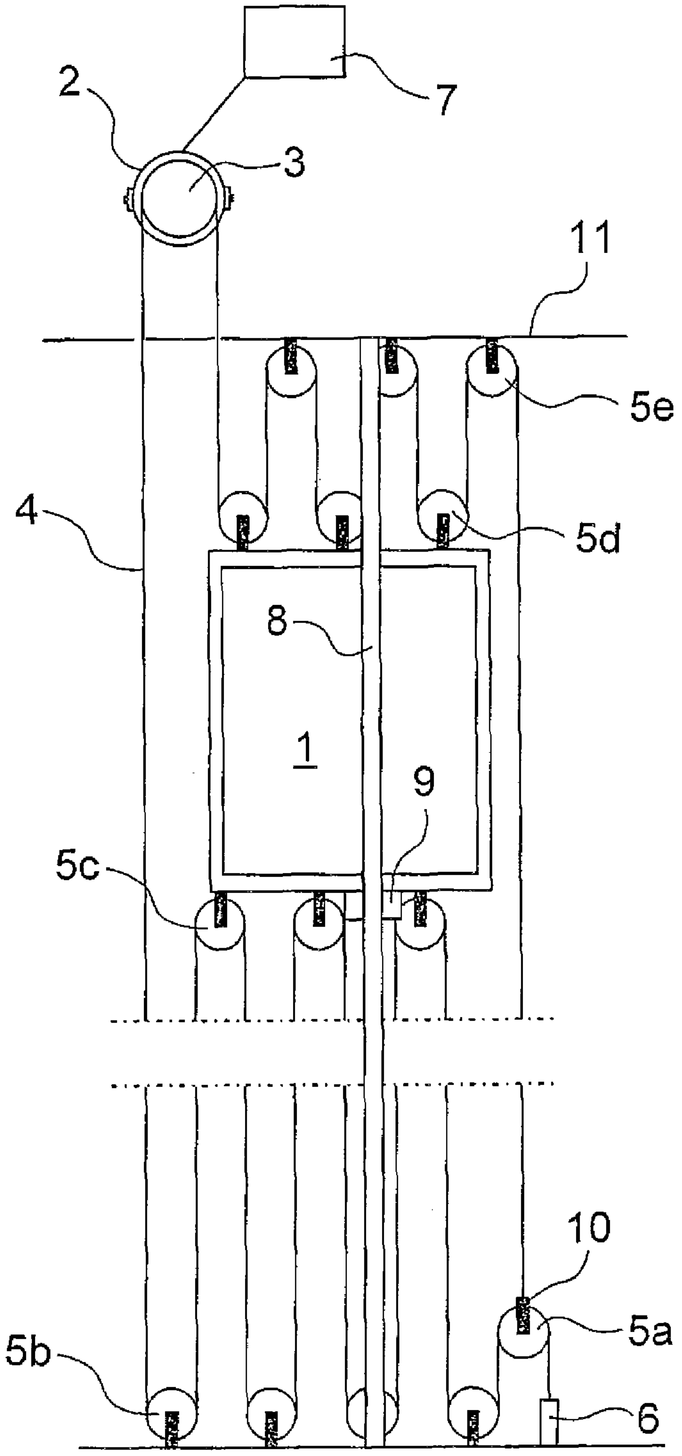
FIG. 1 presents a diagrammatic and simplified side view of a traction sheave elevator without counterweight, in which the method of the invention can be applied.

FIG. 1 presents a typical traction sheave elevator without counterweight provided with a set of ropes, such as hoisting ropes 4, in which the method of the invention for changing a set of hoisting ropes can be applied. The elevator car 1 is suspended by the set of hoisting ropes 4 and it runs up and down in the elevator shaft along guide rails 8 in a substantially vertical direction. The hoisting power to the elevator is supplied by a hoisting machine 2, which is connected to the control system 7 of the elevator. The first end of the set of hoisting ropes 4 is fixed to an anchorage element 6 secured to the lower part of the elevator shaft, from which anchorage the hoisting ropes are guided to run first over a rope force compensating sheave 5*a* placed above the bottom of the elevator shaft and then further under a diverting pulley 5*b* mounted on the bottom of the elevator shaft, from where the rope is further passed over a diverting pulley 5*c* secured to the lower part of the elevator car 1 and then again under another diverting pulley 5*b* and from there again another diverting pulley 5*c* and so on until after the last diverting pulley 5*b* the hoisting ropes 4 are passed over the traction sheave 3 of the hoisting machine 2.

From the traction sheave 3, the hoisting ropes 4 are passed under a diverting pulley 5*d* secured to the overhead beam 11 of the elevator shaft and then over a diverting pulley 5*e* secured to the overhead beam 11 of the elevator shaft and so on until after the last diverting pulley 5*e* the hoisting ropes 4 are passed to a securing element 10 secured to the rope force compensating sheave 5*a*, to which element the second end of the set of hoisting ropes 4 is secured. In practice, the rope suspension may differ from the above description.

Figure 2:
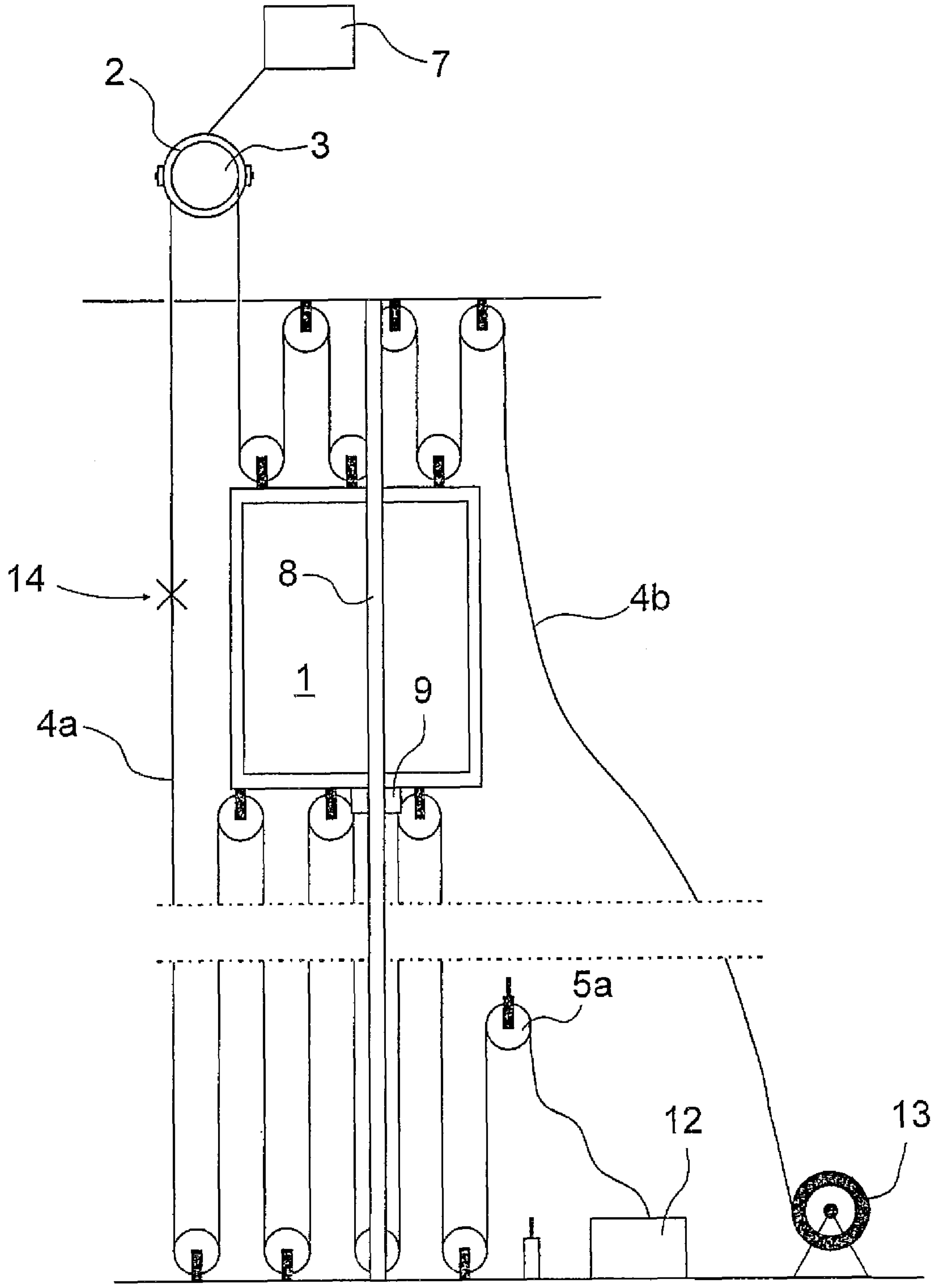
FIG. 2 presents an elevator according to FIG. 1, in which the hoisting ropes are being changed.

FIG. 2 presents an elevator according to FIG. 1, in which the set of hoisting ropes is being changed. By the rope changing method of the invention, the elevator car 1 has been first driven to the topmost floor. After this, the safety gear has been activated so as to support the elevator car 1, and the car is additionally locked in position by means of a safety chain or equivalent, which is secured to a solid place in the elevator shaft. On the bottom of the elevator shaft, the rope force compensating sheave 5*a* has been lifted up and locked in its position. The ends of the old set of hoisting ropes 4*a* have been released from the securing element 10 of the rope force compensating sheave 5*a* and from the anchorage element 6 on the bottom of the elevator shaft, and a drum 13 carrying the new rope 4*b* to be used to replace the old set of hoisting ropes 4*a* has been placed on the bottom of the elevator shaft. In the situation illustrated by FIG. 2, the rope replacement process is already at an advanced stage such that the splice 14 between the new and old sets of hoisting ropes, indicated by a check, has already passed over the traction sheave 3. The pulled-out portion of the old set of hoisting ropes 4*a* has been discarded into a waste bin 12 directly on being pulled out.

Figure 3:
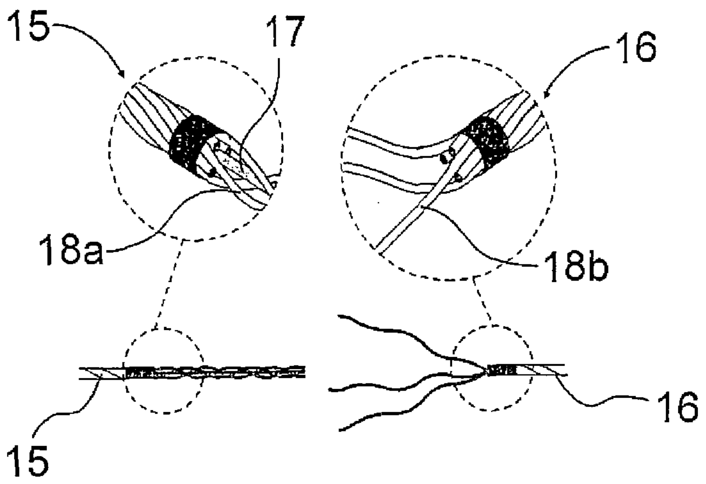
FIG. 3 presents a new and an old hoisting rope with their ends untwisted.

FIG. 3 presents one hoisting rope 15 comprised in the new set of hoisting ropes 4*b* and one hoisting rope 16 comprised in the old set of hoisting ropes 4*a*, with their ends untwisted. The ends of the hoisting ropes 15 and 16 have been untwisted through a suitable length and every second strand of each hoisting rope in the circumferential direction has been removed from this untwisted portion. In addition, the core strand of the old hoisting rope 16 has been removed from this portion. Thus, as it were, from hoisting rope 15 is cut off a strand which is not indicated by a number in the figure but which lies next to strand 18*a* and to which hoisting rope strand 18*b*, which has not been cut off, fits. A safety element 20, such as a piece of tape, is used to prevent the ends of the hoisting ropes 16, 16 from being untwisted.

Figure 4:
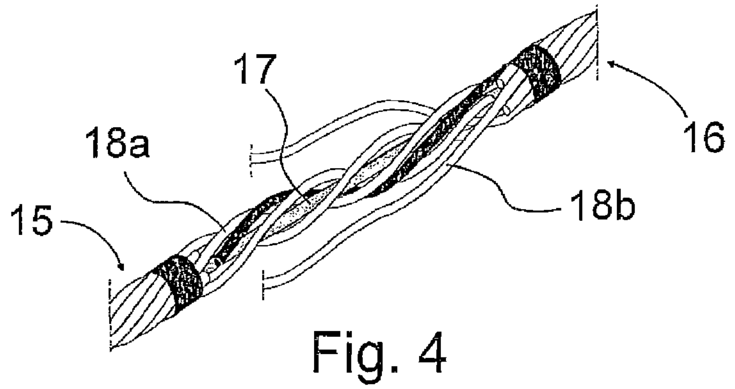
FIG. 4 illustrates the splicing of the new and the old hoisting rope.

FIG. 4 presents the new hoisting rope 15 and the old hoisting rope 16 in a situation where the splicing of the ends of the hoisting ropes has been started. The strands 18*a* of the new rope 15 are being intertwined with the strands 18*b* of the old rope around the core strand 17 of the new rope 15. As stated above, strand 18*b* of rope 16 now fits to the truncated strand of rope 15, and likewise strand 18*a* of rope 15 fits to the truncated but unmarked strand of rope 16 lying next to strand 18*b*. Alternate strands are thus intertwined, producing a compressive force on the rope and improving its tensile strength. A safety element 20, such as a piece of tape is used to prevent the ends of the hoisting ropes 15, 16 from being untwined.

Figure 5:
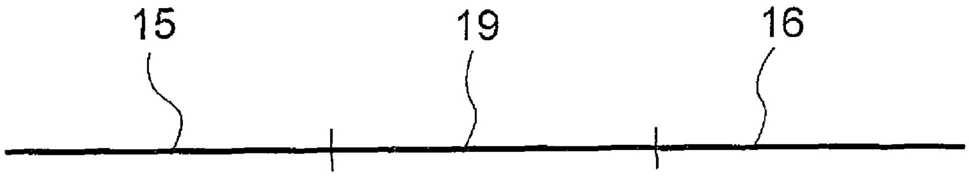
FIG. 5 presents the new and the old hoisting rope spliced together.

FIG. 5 presents the new hoisting rope 15 and the old hoisting rope 16 spliced together. The flexible spliced portion of each hoisting rope has a length in the range of e.g. about 10-80 cm, in the case of a steel rope with a diameter of e.g. 4 mm preferably about 20 cm, and the thickness of the spliced portion is substantially equal to the diameter of the original ropes 15 and 16.

By the method of the invention, the set of hoisting ropes is replaced as follows. The elevator car 1 is driven in restoration mode to the topmost floor so as to permit passage of personnel to the top of the elevator car. After this, the safety gear 9 is activated to support the elevator car 1 and the car is locked with a safety chain secured behind a rail mounting bracket. With the elevator car 1 safely in place, the rope tensions on either side of the hoisting machine 2 are equalized by releasing the brake of the machine. After this, to make sure that the traction sheave 3 can rotate freely, the brake of the hoisting machine is locked mechanically in the released position and the power supply cable of the hoisting machine 2 is disconnected. Thus, even the dynamical braking property will not prevent free rotation of the traction sheave 3 when the hoisting ropes are being pulled.

After the above-mentioned operations, the rope force compensating sheave 5*a* on the bottom of the elevator shaft is raised upwards from its normal position and locked in its new position, whereupon the ends of the old set of hoisting ropes 4*a* are detached from the securing element 10 of the rope force compensating sheave 5*a*.

After this, the first end of the old set of hoisting ropes 4*a* and the end of the new set of hoisting ropes 4*b* on the drum 13 are spliced together. The splicing of the hoisting ropes 15 and 16 of the sets 4*a* and 4*b* of hoisting ropes is performed by first marking one ends of both ropes e.g. with tape up to the portion to be untwisted, whereupon the aforesaid ends are untwisted through a suitable length, which is e.g. between 5-80 cm, preferably about 20 cm, and every second outer strand in the circumferential direction is removed from this portion. In addition, the core strand is also removed from one of the ropes. After this, the ropes 15 and 16 are spliced together over the length of the splice 19 around the core strand 17 of the other rope by intertwining the strands of both ropes 15, 16 around the core strand 17. The intertwining is so implemented that the thickness of the spliced portion 19 will be substantially equal to the thickness of the rope 15, 16, and at the same time the flexibility of the spliced portion 19 is so fitted that it substantially corresponds to the flexibility of the ropes 15, 16. If necessary, the ends of the strands are protected by a safety element 20, e.g. a piece of tape. It is to be noted that these safety elements do not function as a cable pulling sleeve or an equivalent locking element as is used in the prior-art solution to lock together the rope ends to be spliced, but the safety element 20 serves to prevent untwisting of the end of the rope 15, 16 when strands are being truncated. Naturally it is also possible to use tape 20 after the splicing together of the ropes 15, 26 to additionally protect the splice 19, the thickness of the splice 19 being thus substantially equal to the thickness of the rope 15, 16.

Next, the old set of hoisting ropes 4*a* is released from its anchorage 6 on the bottom of the elevator shaft as well and the old set of hoisting ropes 4*a* is pulled out from its place, so the new set of hoisting ropes 4*b* runs after the old set of hoisting ropes from the drum 13 to its place around the diverting pulleys 5*b*-5*e*. As the old hoisting ropes are being pulled out, they are untwisted and passed directly into a waste bin 12 or equivalent. Finally, the ropes are cut to a suitable length and each end is secured to its respective wedge socket. After a test run, the rope tension is checked.

When the ropes are changed, all the parallel hoisting ropes are replaced at the same time and simultaneously by pulling the entire old set of hoisting ropes 4*a* off from the traction sheave 3 and diverting pulleys 5*b*-5*e* and at the same time setting all the parallel ropes of the new set of hoisting ropes 4*b* in place of the old ropes. As the spliced portions 19 are flexible and strong, the new hoisting ropes 15 can be easily pulled around the traction sheave and the diverting pulleys 5*b*-5*e* used in the suspension, without the mounting operation being hindered by the jump guards placed near the rim of the traction sheave and diverting pulleys.

It is obvious to a person skilled in the art that the invention is not exclusively limited to the example described above, but that it may be varied within the scope of the claims presented below. Thus, for example, the elevator car can be locked in place for the duration of the replacement of the hoisting ropes by other methods than by letting it rest supported by the safety gear. The locking may thus be also implemented e.g. by using a guide rail brake or clutch.

It is also obvious to a person skilled in the art that the above-described suspension of the elevator car may differ from the above description. The placement and numbers of diverting pulleys may vary, and the traction sheave may also be located in the upper part of the elevator shaft, in which case certain details of the rope change will differ from those described in the above example.

It is likewise obvious to a person skilled in the art that the order of different steps in the method may vary from that described above. Thus, the other ends of the old set of hoisting ropes can also be released before the splicing together of the ends of the old and new hoisting ropes.

It is further obvious to a person skilled in the art that the diameter of the ropes used may be different from the above-mentioned diameter of 4 mm. Besides 4 mm, the diameter may be 6, 8, 10, 13 or even 16 mm. Likewise, the rope diameter in inches may be any suitable size approximately corresponding to the aforesaid range of 4-16 mm. Similarly, the core, i.e. core strand of the rope may be made of any suitable material, such as steel, fabric, kevlar, teflon, etc.

It is likewise obvious to a person skilled in the art that the solution of the invention can also be used in a suitably suspended elevator provided with a counterweight. Moreover, the invention can be applied in the case of different suspensions starting from a suspension ratio of 2:1. It is further obvious to the skilled person that the suspension ratio may vary even considerably from the afore-mentioned value, as pointed out in the above-described example and the claims below.

It is obvious to the person skilled in the art that the invention is not limited to the embodiments described above, in which the invention has been described by way of example, but that many variations and different embodiments of the invention are possible within the scope of the inventive concept defined in the claims presented below.

The invention claimed is:

1. A method for replacing the ropes of an elevator, where the ropes that are to be replaced are hoisting ropes, said elevator comprising at least an elevator car moving along guide rails in an elevator shaft in a substantially vertical direction and provided with a hoisting machine a traction sheave, a plurality of diverting pulleys and an existing set of hoisting ropes, the method comprising:

joining a new set of hoisting ropes and the existing set of hoisting ropes by splicing both sets of hoisting ropes together by their one ends, where joining includes:

untwisting the one ends of each new and existing hoisting rope through a suitable length of rope;

removing strands from the untwisted ends so that every second strand seen in a circumferential direction is truncated;

cutting a core strand of one of the hoisting ropes and;

splicing the untwisted hoisting rope ends together around a core strand of the other hoisting rope; and pulling the new set of hoisting ropes over diverting pulleys using the existing set of hoisting ropes by pulling the existing set of hoisting ropes out from the diverting pulleys so that the new set of hoisting ropes runs over the diverting pulleys and the traction sheave.

2. The method according to claim 1, wherein said splicing further comprises keeping a thickness of the splice substantially equal to a diameter of the other hoisting rope.

3. The method according to claim 2, wherein said splicing comprises splicing the ends of the hoisting ropes together around the core strand of said other hoisting rope in such manner that the length of the finished splice is between 10 and 80 cm, and that the splice has a flexibility substantially the same as a flexibility of said other hoisting rope.

4. The method of claim 3, wherein the length of the finished splice is 20 cm.

5. The method according to claim 2, wherein said splicing comprises splicing the ends of the hoisting ropes together around the core strand of said other hoisting rope in such manner that the thickness of the finished splice is substantially equal to the diameter of the other hoisting rope.

6. The method according to claim 2, the method further comprising:

before said splicing:

locking the elevator car in place in the elevator shaft;

equalizing rope tensions on both sides of the hoisting machine by releasing a brake of the hoisting machine and locking the brake in a released position;

disconnecting a supply cable of the hoisting machine;

locking a compensating sheave in an upper position;
disengaging the existing set of hoisting ropes from the compensating sheave; and
after said splicing, the pulling the new set of hoisting ropes over diverting pulleys using the existing set of hoisting ropes includes:
releasing the existing set of hoisting ropes from an anchorage element at the lower part of the shaft; and
pulling the existing set of hoisting ropes, and simultaneously feeding the new set of hoisting ropes in place of the existing set of hoisting ropes.

7. The method according to claim 1, wherein said splicing further comprises splicing the ends of the hoisting ropes together around the core strand of said other hoisting rope in such manner that a thickness of the finished splice is substantially equal to a diameter of said other hoisting rope.

8. The method according to claim 7, wherein said splicing comprises splicing the ends of the hoisting ropes together around the core strand of said other hoisting rope in such manner that the length of the finished splice is between 10 and 80 cm, and that the splice has a flexibility substantially the same as a flexibility of said other hoisting rope.

9. The method of claim 8, wherein the length of the finished splice is 20 cm.

10. The method according to claim 7, the method further comprising:
before said splicing:
locking the elevator car in place in the elevator shaft;
equalizing rope tensions on both sides of the hoisting machine by releasing a brake of the hoisting machine and locking the brake in a released position;
disconnecting a supply cable of the hoisting machine;
locking a compensating sheave in an upper position;
disengaging the existing set of hoisting ropes from the compensating sheave; and
after said splicing, the pulling the new set of hoisting ropes over diverting pulleys using the existing set of hoisting ropes includes:
releasing the existing set of hoisting ropes from an anchorage element at the lower part of the shaft;
pulling the existing set of hoisting ropes, and simultaneously feeding the new set of hoisting ropes in place of the existing set of hoisting ropes.

11. The method according to claim 1, wherein said splicing further comprises splicing the ends of the hoisting ropes together around the core strand of said other hoisting rope such that the length of the finished splice is between 10 and 80 cm and that the splice has a flexibility substantially the same as a flexibility of said other hoisting rope.

12. The method according to claim 11, the method further comprising:
before said splicing:
locking the elevator car in place in the elevator shaft;
equalizing rope tensions on both sides of the hoisting machine by releasing a brake of the hoisting machine and locking the brake in a released position;
disconnecting a supply cable of the hoisting machine;
locking a compensating sheave in an upper position;
disengaging the existing set of hoisting ropes from the compensating sheave; and
after said splicing, the pulling the new set of hoisting ropes over diverting pulleys using the existing set of hoisting ropes includes:
releasing the existing set of hoisting ropes from an anchorage element at the lower part of the shaft;
pulling the existing set of hoisting ropes, and simultaneously feeding the new set of hoisting ropes in place of the existing set of hoisting ropes.

13. The method of claim 11, wherein the length of the finished splice is 20 cm.

14. The method according to claim 1, the method further comprising:
before said splicing:
locking the elevator car in place in the elevator shaft;
equalizing rope tensions on both sides of the hoisting machine by releasing a brake of the hoisting machine and locking the brake in a released position;
disconnecting a supply cable of the hoisting machine;
locking a compensating sheave in an upper position; and
disengaging the existing set of hoisting ropes from the compensating sheave; and
after said splicing, the pulling the new set of hoisting ropes over diverting pulleys using the existing set of hoisting ropes includes:
releasing the existing set of hoisting ropes from an anchorage element at the lower part of the shaft; and
pulling the existing set of hoisting ropes, and simultaneously feeding the new set of hoisting ropes in place of the existing set of hoisting ropes.

15. The method of claim 1, further comprising securing the spliced hoisting rope ends with a safety element to prevent the spliced rope ends from become untwisted.

16. The method of claim 1, wherein the elevator is a traction sheave elevator without counterweight.

17. The method of claim 1, the method further comprising allowing the traction sheave to freely rotate by mechanically locking a brake of the hoisting machine in a released position and disconnecting a power supply cable of the hoisting machine, where said allowing is accomplished before said pulling.

18. A method for replacing the ropes of an elevator, said elevator comprising at least an elevator car moving along guide rails in an elevator shaft in a substantially vertical direction and provided with a hoisting machine, a traction sheave, a plurality of diverting pulleys and an existing set of ropes, the method comprising:
joining a new set of hoisting ropes and an existing set of hoisting ropes by splicing the ropes of both sets together by their one ends;
pulling the new set of hoisting ropes over diverting pulleys using the existing set of hoisting ropes, wherein the ropes that are to be replaced are hoisting ropes, by pulling the existing set of hoisting ropes out from the diverting pulleys so that the new set of hoisting ropes runs over the diverting pulleys and the traction sheave;
before said splicing:
locking the elevator car in place in the elevator shaft;
equalizing rope tensions on both sides of the hoisting machine by releasing a brake of the hoisting machine and locking the brake in a released position;
disconnecting a supply cable of the hoisting machine;
locking a compensating sheave in an upper position; and
disengaging the existing set of hoisting ropes from the compensating sheave; and
after said splicing, pulling the new set of hoisting ropes over diverting pulleys using the existing set of hoisting ropes by:
releasing the existing set of hoisting ropes from an anchorage element at the lower part of the shaft; and pulling the existing set of hoisting ropes, and simultaneously feeding the new set of hoisting ropes in place of the existing set of hoisting ropes.

* * * * *